(12) United States Patent
Hui et al.

(10) Patent No.: US 10,313,161 B2
(45) Date of Patent: Jun. 4, 2019

(54) EFFICIENT MEDIUM ACCESS WITH DIRECTION AWARENESS

(71) Applicant: Telefonaktiebolaget LM Ericsson (publ), Stockholm (SE)

(72) Inventors: Dennis Hui, Sunnyvale, CA (US); Robert Baldemair, Solna (SE); Jonas Kronander, Knivsta (SE); Kumar Balachandran, Pleasanton, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 187 days.

(21) Appl. No.: 15/028,771

(22) PCT Filed: Oct. 25, 2013

(86) PCT No.: PCT/SE2013/051251
§ 371 (c)(1),
(2) Date: Apr. 12, 2016

(87) PCT Pub. No.: WO2015/060759
PCT Pub. Date: Apr. 30, 2015

(65) Prior Publication Data
US 2016/0254930 A1  Sep. 1, 2016

(51) Int. Cl.
*H04L 5/00* (2006.01)
*H04L 25/02* (2006.01)
(Continued)

(52) U.S. Cl.
CPC ........ *H04L 25/0228* (2013.01); *H04L 5/0048* (2013.01); *H04W 74/08* (2013.01); *H04W 72/046* (2013.01)

(58) Field of Classification Search
CPC .. H04L 25/0228; H04L 5/0048; H04W 74/08; H04W 72/046
See application file for complete search history.

(56) References Cited

U.S. PATENT DOCUMENTS

2007/0201412 A1   8/2007  Ji et al.
2007/0298742 A1*  12/2007 Ketchum ............. H04B 7/0617
                                                  455/186.1
(Continued)

FOREIGN PATENT DOCUMENTS

WO        2012049533 A1     4/2012

OTHER PUBLICATIONS

Gong, Michelle X. et al., "A Directional CSMA/CA Protocol for mmWave Wireless PANs," Proceedings of the IEEE Wireless Communications and Networking Conference (WCNC), Apr. 18-21, 2010, Sydney, Australia, IEEE, 6 pages.

(Continued)

*Primary Examiner* — Walter J Divito
(74) *Attorney, Agent, or Firm* — Withrow & Terranova, PLLC

(57) ABSTRACT

The present disclosure presents a method performed in a first node in a wireless communication system, of accessing a shared channel for transmission from the first node to at least one second node. The method comprises the step of receiving, from a third node a pilot signal announcing reception in the third node, wherein the pilot signal comprises information enabling estimation of a channel response from the first node to the third node; estimating, using the pilot signal, a channel response from the first node to the third node and predicting, based on the estimated channel response, an interference level at the receiver of the third node of a directive transmission from the first node to the second node; and accessing the shared channel based on the predicted interference level.

15 Claims, 10 Drawing Sheets

(51) Int. Cl.
*H04W 72/04* (2009.01)
*H04W 74/08* (2009.01)

(56) References Cited

U.S. PATENT DOCUMENTS

| | | | |
|---|---|---|---|
| 2010/0067505 A1 | 3/2010 | Fein et al. | |
| 2012/0087332 A1* | 4/2012 | Kim | H04B 7/063 370/329 |
| 2014/0161165 A1* | 6/2014 | Hiscock | H04L 27/2601 375/224 |

OTHER PUBLICATIONS

Kobayashi, Kou, et al., "Spatially Divided Channel Scheme using Sectored Antennas for CSMA/CA—'Directional CSMA/CA'," 11th IEEE International Symposium on Personal, Indoor and Mobile Radio Communications (PIMRC), vol. 1, 2000, London, England, IEEE, pp. 227-231.

Mundarath, J.C., et al., "NULLHOC: A MAC Protocol for Adaptive Antenna Array Based Wireless Ad Hoc Networks in Multipath Environments," IEEE Global Telecommunications Conference (GLOBECOM), vol. 5, Nov. 29-Dec. 3, 2004, IEEE, pp. 2765-2769.

Raghavan, Vasanthan, et al., "Limited Feedback Precoder Design for Spatially Correlated MIMO Channels," 41st Annual Conference on Information Sciences and Systems (CISS), Mar. 14-16, 2007, Baltimore, Maryland, IEEE, 6 pages.

International Search Report and Written Opinion for International Patent Application No. PCT/SE2013/051251, dated Jun. 24, 2014, 14 pages.

Babich, Fulvio et al., "Interference Mitigation on WLANs Using Smart Antennas," Wireless Personal Communications, vol. 36, Issue 4, Mar. 29, 2006, Springer, pp. 387-401.

Babich, Fulvio et al., "Sustainable simultaneous communications in ad-hoc-networks using smart antenna systems," The Journal of Mobile Communication, Computation and Information, vol. 15, Issue 8, Feb. 29, 2008, Springer Science + Business Media, LLC, pp. 1074-1085.

Bazan, Osama, "A Survey on MAC Protocols for Wireless Adhoc Networks with Beamforming Antennas," IEEE Communications Surveys & Tutorials, vol. 14, Issue 2, 2012, IEEE, pp. 216-239.

Cesana, Matteo et al., "Interference Aware (IA) MAC: an Enhancement to IEEE802.11b DCF," IEEE 58th Vehicular Technology Conference (VTC), Oct. 6-9, 2003, Orlando, FL, USA, IEEE, pp. 2799-2803.

Singh, A et al., "Spatial Reuse through Adaptive Interference Cancellation in Multi-Antenna Wireless Networks," IEEE Global Telecommunications Conference (GLOBECOM), Nov. 28-Dec. 2, 2005, St. Louis, MO, USA, IEEE, pp. 3092-3096.

International Preliminary Report on Patentability for International Patent Application No. PCT/SE2013/051251, dated May 6, 2016, 11 pages.

Extended European Search Report for European Patent Application No. 13895811.1, dated May 26, 2017, 12 pages.

* cited by examiner

EFFICIENT MEDIUM ACCESS WITH DIRECTION AWARENESS

This application is a 35 U.S.C. § 371 national phase filing of International Application No. PCT/SE2013/051251, filed Oct. 25, 2013, the disclosure of which is incorporated herein by reference in its entirety.

TECHNICAL FIELD

The disclosure relates to future radio access systems and more specifically to methods for media access in future radio access systems. The disclosure further relates to methods for reserving and accessing a shared media in radio access systems, as well as to wireless network nodes.

BACKGROUND

Today's cellular communication occurs mainly in frequency bands below 3 GHz. However, while LTE can operate over bandwidths of as much as 100 MHz by design, the future radio access system envisaged would operate over bandwidths of the order of 1 GHz. Clearly, such a system could not operate in bands below 3 GHz. The lowest band where the mobile industry may home for spectrum parcels that exceed the 10-40 MHz of contiguous allocations typical for the industry is probably above 3 GHz. Out of the regions of spectrum that are most promising for the mobile industry, the cm-Wave, CMW, region from 3-30 GHz and the mm-Wave, MMW, region from 30-300 GHz are particularly interesting for next generation mobile systems.

Furthermore, the IEEE 802.11 standardization effort is planning amendments termed IEEE 802.11ac and IEEE 802.11ad that will enable very high throughput communication over bandwidths such as 160 MHz for the former and 2 GHz for the latter. 802.11ac will operate in the CMW bands such as the 5 GHz ISM band while 802.11ad is targeting the 60 GHz unlicensed band.

Without specifying the exact band where we would operate the future radio access FRA system, the next standard is assumed to operate over bandwidths that range from 100 MHz to 2.5 GHz in dense deployments and over frequency bands that allow the use of beam forming to establish near Line of Sight links between communicating radios.

The resulting system can be used in a variety of scenarios:
1) Point-to-point communications for short range radio systems
2) Access links for a Future Radio Access, FRA, system that provides very high speed connectivity or
3) Backhaul links between densely deployed infrastructure nodes that provide a high throughput pipeline to a network operator's core network; this core network would connect to the Internet and provide access to data and multimedia services.

One of the challenges of operating at MMW frequencies is the received power that decreases with frequency when using omnidirectional antennas because the antenna aperture—which determines how much power is received—decreases with frequency for an omnidirectional antenna and thus also the received power. To overcome this problem antenna area can be increased leading to directive antennas. Generally speaking, directive antennas and beam forming become an important component for MMW communication.

CSMA/CD

Carrier Sense Multiple Access/Collision Avoidance, CSMA/CA, is a contention based medium access mechanism used in the 802.11 standards to allow distributed coordination of the resources among users contending for the medium. In this disclosure CSMA/CD is referred to as an example of a contention based MAC protocol. CSMA/CD is therefore briefly described.

FIG. 1 illustrates a four-way handshaking in a CSMA/CA system based on Request-To-Send/Clear-To-Send, RTS/CTS, for unicast data above a certain threshold. In FIG. 1, a first node, user A, wants to send a data packet to another node, user B. User A then sends a request to send, RTS, to the intended receiver. If the receiver is ready to receive, it broadcasts a clear to send, CTS, message. After receiving the CTS, the sender transmits the packet. All other nodes that receive the CTS refrain from transmission. This mechanism addresses the hidden/exposed terminal problem, described below.

To control the access to the medium, CSMA/CA uses inter-frame spaces, IFS, during which a node has to wait before sensing the channel and determining whether it is free. The 802.11 standard specifies different IFSs to represent different priority levels for the channel access: the shorter the IFS, the higher the priority. For instance, Short IFS, SIFS, is used for immediate acknowledgement of a data frame and Distributed Coordination Function IFS, DIFS, is used to gain access to the medium to transmit data, as further illustrated in FIG. 1.

Furthermore, to allow virtual carrier sensing, every data frame may contain the time needed for its transmission including the ACK, based on this information other nodes, here user C, will maintain a Network Allocation Vector, shown as NAV in FIG. 1, to determine when they should sense the medium again. The NAV is decremented by clock and no access is allowed as long as its value is above 0. The other nodes will again sense the medium after NAV and the subsequent DIFS.

In addition, in order to avoid situations where two nodes transmit at the same time leading to a collision, every node needs to wait for the medium to become free and then invoke the back off mechanism. For this, each node selects a random back off interval, illustrated by the checked box in FIG. 1, within [0, CW], where CW is called the contention window and is initialized to a value CWmin. The node decrements the backoff timer every idle time slot until the counter reaches 0 and the node sends the packet. The CWmin is doubled on each collision until it reaches a maximum threshold called CWmax.

Beam Forming

Beam forming is a general set of techniques to control the radiation pattern of a radio signal. One way of achieving this is to use several fixed antenna elements. The total antenna pattern can be controlled by adjusting the antenna weights of the signal components radiating from each individual antenna element. Such antenna weights or beam forming coefficients can be calculated to direct the transmitted energy towards the position of the intended receiver, while simultaneously reducing the amount of energy radiated in unwanted directions.

Transmit beam forming is a key enabler for enhancing the capacity and the energy efficiency in a cellular network and is therefore of major importance in future radio access systems. The received signal strength is increased due to the increased antenna gain resulting from the beam forming operation. At the same time interference is spread over a smaller area, typically resulting in reduced interference levels for all users in the system. Increased Signal to Interference and Noise, SINR, results in higher bit-rates and higher capacity. Higher SINR in a packet oriented system results in shorter packet transmission times. This also helps to reduce the energy consumption in the system since transmitters and receivers can be put into idle mode during a larger ratio of time.

In the simplest form an antenna radiation pattern can be described as pointing in a certain direction with a certain beam width. The direction of the maximum gain of the antenna pattern (usually denoted boresight) can be described as a vector with a vertical component (usually denoted elevation or antenna tilt) and a horizontal component (usually denoted azimuth). The beam width also has two dimensions, one vertical and one horizontal.

Receive beam forming uses the reciprocity of transmit and receive paths to apply directionality towards the receiver. Like transmit beam forming, one way to achieve directivity is to use a number of fixed antenna elements whose phases are controlled to steer the direction of the resultant antenna pattern.

The gain of a directive antenna (i.e. the gain by how much the desired signal is amplified over the signal of an omnidirectional antenna) increases with decreasing beam width. The narrower the generated beam the higher the antenna gain.

A well-known problem of contention based MAC protocols when used together with beam forming are hidden nodes. See FIG. 2 for a graphical illustration. In FIG. 2a two transmitters, 20a and 20b, are both contending for the medium—and thus listen to the medium—may not hear each other due to the directive transmissions of the other. At the destination node, 10a,—since both nodes want to communicate with the same node they direct their respective beams towards the common receiver—a collision occurs.

One well known possible way to mitigate this problem is that each transmitter sends prior to the directive transmission an omnidirectional pilot signal as illustrated in FIG. 2b. For example, the RTS and CTS described above may be implemented as omnidirectional pilots. Contending transmitter in the neighbourhood can overhear the omnidirectional pilot transmission and refrain from accessing the medium.

One drawback with this solution is that it may be overly pessimistic: It avoids all simultaneous transmissions in a neighbour using the same resources. If all transmissions are intended for the same reception node this is desirable. And all transmissions in the neighbourhood are avoided until the entire message exchange sequence is finished (as described above in the description of the NAV).

However, if not all transmissions are intended for the same receiving node this approach becomes overly pessimistic since even non-colliding transmissions are avoided, see FIG. 3. In FIG. 3 two user equipments 20a, 20b want to communicate with two access nodes 10a, 10b, respectively. Since directed into different directions their transmissions do not collide. However, the omnidirectional pilot signals sent by the user equipments 20a, 20b are overheard by the user equipments 20b, 20a, respectively, and therefore both user equipments apply a random back-off according to the MAC protocol.

SUMMARY

The proposed technique suggests medium reservation and medium access based on the use of omnidirectional pilot signals transmitted during an existing communication. The technique allows the medium to be more efficiently utilized by taking directional information into account at a contending transmitter.

The present disclosure presents a method performed in a first node in a wireless communication system, of accessing a shared channel for transmission from the first node to at least one second node. The method comprises the step of receiving, from a third node a pilot signal announcing reception in the third node, wherein the pilot signal comprises information enabling estimation of a channel response from the first node to the third node. The method further comprises estimating, using the pilot signal, a channel response from the first node to the third node and predicting, based on the estimated channel response, an interference level at the receiver of the third node of a directive transmission from the first node to the second node. The method finally comprises accessing the shared channel based on the predicted interference level. The presented method mitigates the problem of hidden nodes for directive transmissions. The estimation of a channel response between the first and the third node makes it possible to make granular interference calculations, which enables spatial reuse that in prior art is not possible. The method is applicable to use in any MAC protocol.

According to one aspect, the pilot signal comprises a sequence, whose auto-correlation properties imply that the correlation of cyclically shifted versions of the sequence is below a predetermined value. By including a sequence having good auto correlation properties, more precise estimations of a channel response are possible. According to one aspect, such a sequence is a Zadoff-Chu, Frank or Milewski sequence.

According to one aspect, the step of estimating a channel response from the first node to the third node comprises calculating channel response from the third node to the first node and assuming channel reciprocity.

According to one aspect the method further comprises configuring the transmission from the first node to the second node in order to avoid interference of the directive transmission from the first node, at the receiver of the third node. Thereby, medium reservation is less coarse resulting in (space-wise) more confined medium reservations. More narrow medium reservations result in less waiting time and more transmission opportunities which increases system throughput.

The proposed technique further relates to a method, performed in a third node in a wireless communication system, of reserving a shared channel for reception from at least one further node. The method comprises the step of configuring a pilot signal to announce reception in the third node, including in the pilot signal information enabling estimation of the channel response between the third node and a receiving node and transmitting the pilot signal to reserve the shared channel. The pilot signal enables less coarse channel reservations in the receiving node, as mentioned above. The proposed technique further relates to a method, performed in a fourth node in a wireless communication system, of granting a fifth node access to a shared channel for transmission from the fifth node to the fourth node. The method comprises receiving, from a third node a pilot signal announcing reception in the third node, wherein the pilot signal comprises information enabling estimation of a channel response from the fourth node to the third node.

The method further comprises calculating, using the a pilot signal, a channel response from the fourth node to the third node, calculating a channel response from the fifth node to the fourth node and predicting, based on the estimated channel responses an interference level at the receiver of the third node of a directive transmission from the fifth node. The method further comprises granting the fifth node access to the shared channel based on the predicted interference level. Through this aspect, it is possible to control the medium access in a fifth node, which might not itself hear the pilot signal.

According to a further aspect the proposed technique relates to a first node in a wireless communication system, configured for accessing a shared channel for transmission from the first node to at least one second node. The first node comprises a communication unit and processing circuitry. The processing circuitry are adapted to receive, using the communication unit, from a third node a pilot signal announcing reception in the third node, wherein the pilot signal comprises information enabling estimation of a channel response from the first node to the third node and estimate, using the pilot signal, a channel response from the first node to the third node. The processing circuitry are further adapted to predict, based on the estimated channel response, an interference level of a directive transmission from the first node to the second node at the receiver of the third node and access, using the communication unit, the shared channel based on the predicted interference level.

According to a further aspect the proposed technique relates to a third node, in a wireless communication system, configured for reserving a shared channel for reception from at least one further node. The third node comprises a communication unit and processing circuitry. The processing circuitry are adapted to configure a pilot signal to announce reception in the third node information enabling estimation of the channel response between the third node and a receiving node. The processing circuitry are further adapted to transmit, using the communication unit to reserve the shared channel.

According to a further aspect the proposed technique relates to a fourth node in a wireless communication system, configured for granting a fifth node access to a shared channel for transmission from the fifth node to the fourth node. The fourth node comprises a communication unit and processing circuitry. The processing circuitry are adapted to receive, using communication unit a pilot signal announcing reception in the third node comprises information enabling estimation of a channel response from the fourth node to the third node and calculate a channel response from the fifth node to the fourth node caused by a directive transmission from the fifth node and grant the fifth node access to the shared channel based on the predicted interference level.

According to a further aspect the proposed technique relates to a computer program, comprising computer readable code which, when run on a node in a communication system, causes the node to perform the method described above.

With the above description in mind, the object of the present disclosure is to overcome at least some of the disadvantages of known technology as described above and below.

DETAILED DESCRIPTION

In this disclosure, effective methods of medium reservation and medium access based on the use of omnidirectional pilot signals transmitted during an existing communication are proposed. The disclosure allows the medium to be more efficiently utilized by taking directional information into account at a contending transmitter. Specifically, several methods are proposed for a contending transmitter equipped with multiple antennas to avoid causing excessive interference to any existing communication(s) based on directional information derived from a pilot signal transmitted from a potentially colliding node.

Embodiments of the present disclosure are in general directed, to a CSMA/CD system as described above. However, it must be understood that the same principle is applicable in other systems, where nodes are competing for a channel. Such a system may comprise both scheduled and contention based transmissions in any combination. The proposed solution enables more efficient spatial reuse than possible in prior art solutions. The technique is applicable to use in any MAC protocol, in particular in any of the MAC protocols specified in IEEE 802.11 standards. The proposed technique may in some cases only be used in a certain aspect, e.g. only during the initial access, of a communication system that has both scheduled and contention-based modes of operation. It may even be used in a dynamical spectrum sharing scenario (over unlicensed or shared spectrum with registered usage), where multiple different communication systems co-exists where the only common knowledge is where a common pilot channel is located. The disclosure is in particular applicable but not limited to situations where directive communication transmissions are used.

As the surrounding environments of a transmitter and its receiver can be quite different from each other, trying to draw inference about the presence of a nearby destination node from the transmission of a source node can often lead to an erroneous conclusion. The medium may be more effectively protected through omnidirectional pilots transmitted by the destination node, i.e. the intended receiver of the directional transmission, instead of the source node.

Figure 1:
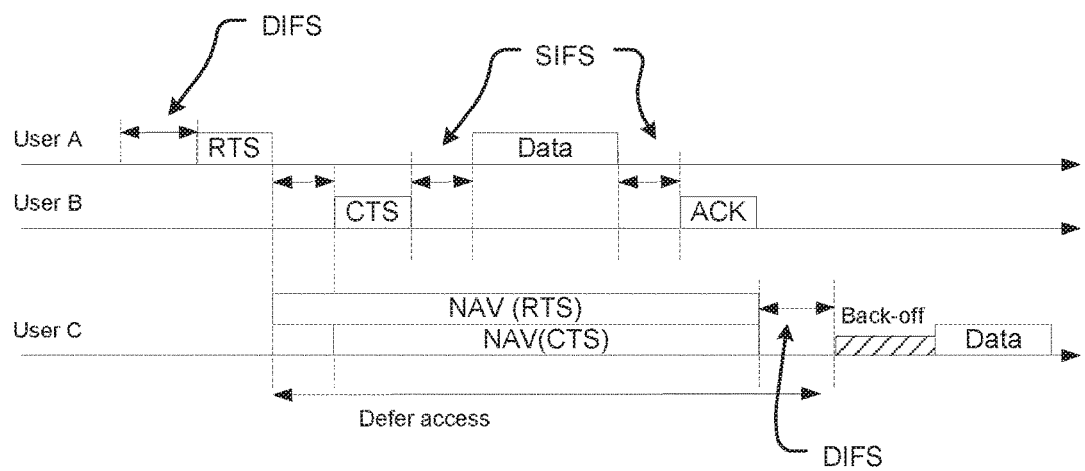
FIG. 1 illustrates RTS/CTS handshake for collision avoidance in CSMA/CA
Figure 2A:
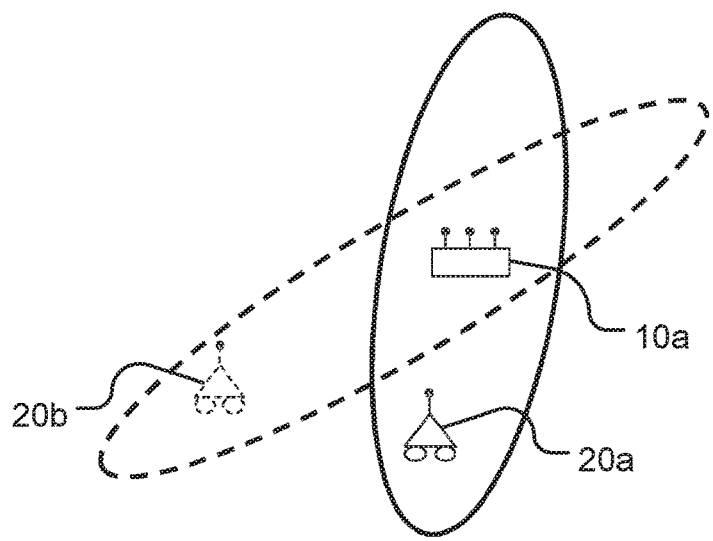
FIG. 2a illustrates the hidden node problem.
Figure 2B:
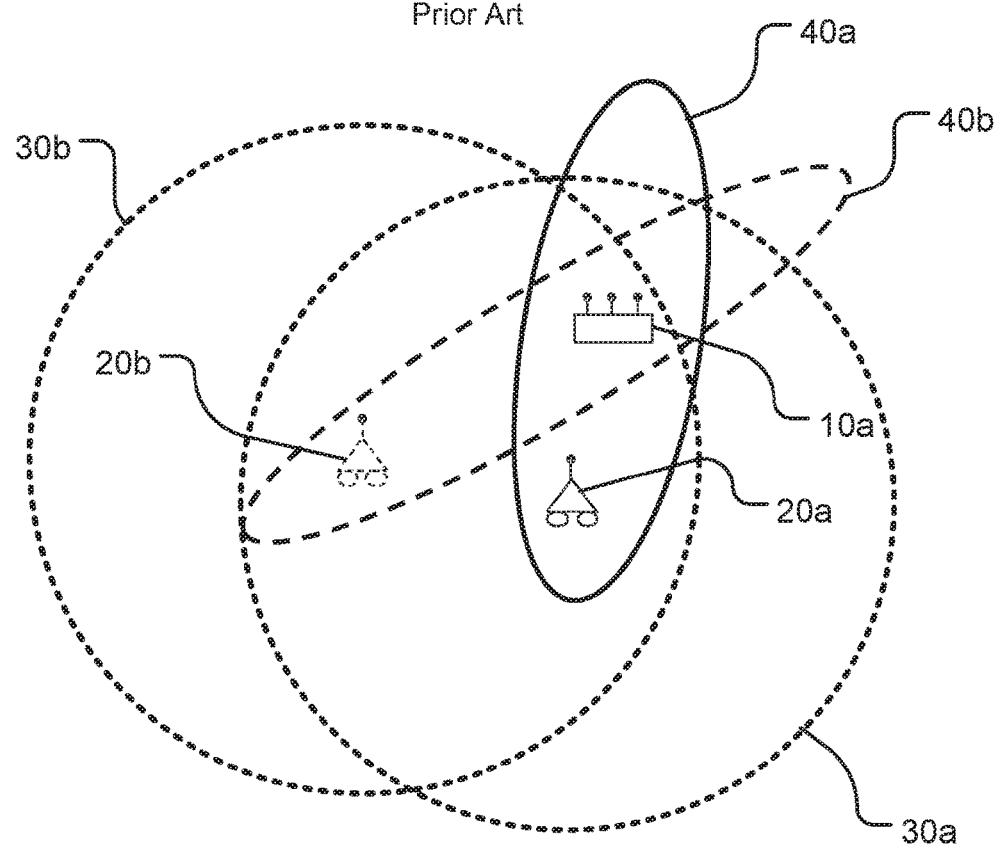
FIG. 2b illustrates using omnidirectional pilot signals to reduce the hidden node problem.
Figure 3:
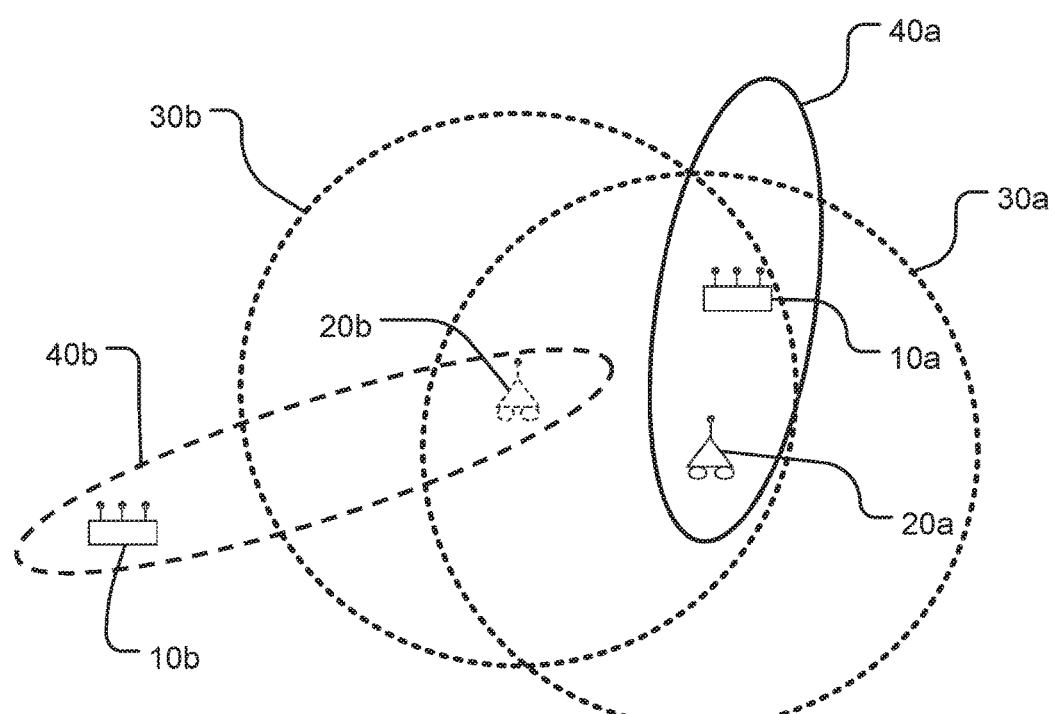
FIG. 3 illustrates pilots refraining transmissions even when the directive transmissions do not collide.
Figure 4:
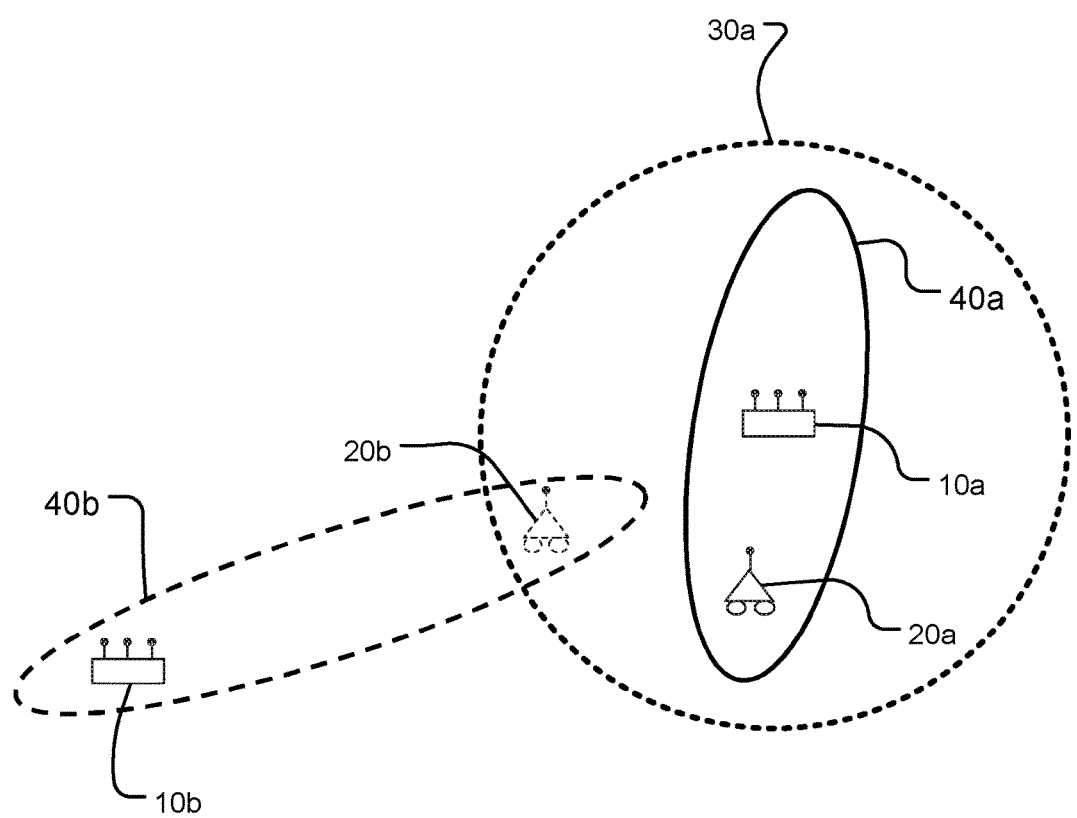
FIG. 4 illustrates transmission of pilot signals from destination.

Pilots from destination, is illustrated in FIG. 4. In FIG. 4, when a source node, 20a, transmits data to a receiving node, 10a, through directional transmission via beam forming, the receiving node 10a periodically responds by transmitting an omnidirectional pilot signal 30a on a different but designated radio resource to its surroundings so that a nearby node 20b can sense the omnidirectional pilot signal and refrain from transmitting so as to avoid causing interference to the reception at the receiving node 10a. The omnidirectional transmission may contain information regarding the remaining duration of the directional transmission so that the nearby node 20b may know how long it should wait before sensing the medium again. If a transmitter 20e cannot hear the omnidirectional transmission, it should be far enough from the intended receiver, 10a, of the directional transmission 40e that the directional transmission of 20e to access point 10e would have minimal impact to the receiving node 10a.

The location of the designated radio resource for the omnidirectional transmission in the time-frequency plane may be tied to the location of the radio resource used for the directional transmission. It may be located on a separate frequency band possibly in a lower frequency range than that of the directional transmission to achieve a larger coverage area. In order to avoid transmitting and receiving at the same time using the same radio at the second node, user equipment 20d, a separate radio may be needed to support the omnidirectional transmission while receiving the directional transmission. Alternatively, the designated radio resource may simply be a time instance or time slot that is different from that of the directional transmission.

Figure 5:
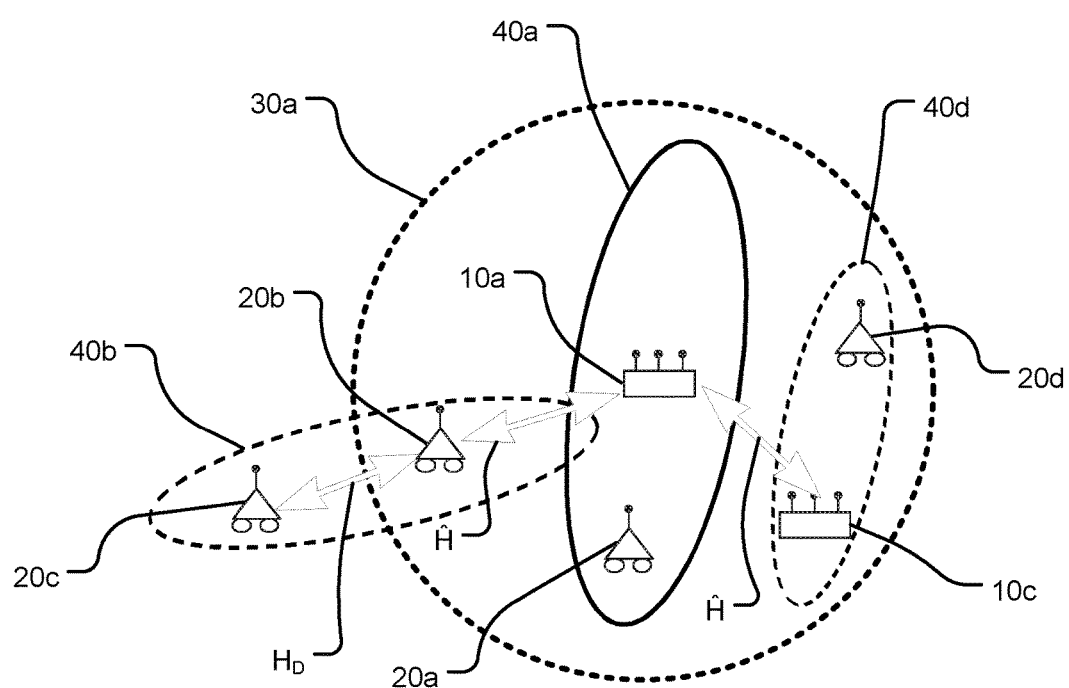
FIG. 5 illustrates using pilot signal channel information for directed transmissions.

As stated above, avoiding all simultaneous transmissions from contending transmitters in the entire neighbourhood using the same radio resources can be too pessimistic and leads to an inefficient utilization of the precious resources. According to the proposed technique, an omnidirectional pilot signal announcing an ongoing reception in a node may also be used by any nearby contending transmitter equipped with multiple antennas to estimate the MIMO channel information between a contending transmitter and the destination node receiving an on-going directional transmission. Based on the estimated channel information, the contending transmitter may derive directional information in order to avoid interfering with the on-going reception whenever possible. The prerequisite is that the pilot signal comprises information enabling estimation of a channel response $\hat{H}$ or certain knowledge (such as direction, path loss, and/or delay) related to the channel between the node sending the pilot signal and the node receiving the pilot signal. This is illustrated in FIG. 5, where a first node, here access point 10c, that wants to transmit a beam formed or directional signal to a second node, user terminal 20d, estimates the channel between access point 10c and the user equipment 20d. Based on the channel estimate and the beam-forming vector or precoding matrix, P, that would be used for the directional transmission to user equipment 20d, the access point can decide whether to send a request to send, RTS, to user equipment 20d. The decision is e.g. made by computing the predicted level of interference that would incur at a nearby access point 10a if a directional signal is to be transmitted to the user equipment 20d. The predicted level of interference is based on an estimated channel response $\hat{H}$ from nearby an access point 10a sending a pilot signal enabling channel estimation to access point 10c.

Figure 6:
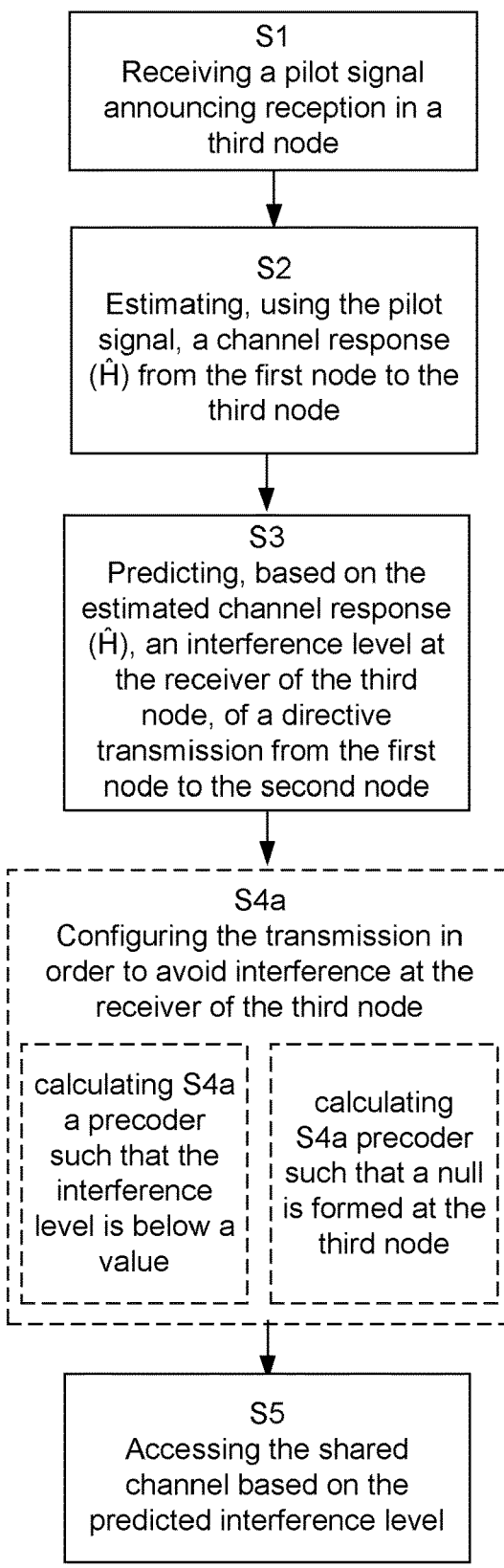
FIG. 6 is a flowchart illustrating method steps executed in a node receiving a pilot according to one aspect of the disclosure.

The proposed method for accessing a channel in the system of FIG. 5 will now be described using the flow chart of FIG. 6, illustrating the method steps executed in a node receiving a pilot according to one aspect of the disclosure.

The proposed technique relates to a method, performed in a first node 10c in a wireless communication system, of accessing a shared channel for transmission from the first node 10c to at least one second node 20d.

In the first step S1 the first node receives, from a third node 10a, a pilot signal 30a announcing reception in the third node 10a. The announcement typically comes from a standardized time slot and/or frequency band/chunk, with a standardized sequence that is all known to all the nodes in the system before the transmission is initiated. Alternatively such information may also be acquired over a predefined broadcast channel (located in a predetermined/standardized time slot and frequency) in the system. According to the proposed technique, the pilot signal 30a comprises information enabling estimation of a channel response $\hat{H}$ from the first node 10c to the third node, an access point 10a. According to one aspect, the pilot signal 30a comprises a sequence, whose auto-correlation properties imply that the correlation of cyclically shifted versions of the sequence is below a predetermined value, and which is thus suitable for channel estimation purposes. Examples of such sequences are a Zadoff-Chu, Frank or Milewski sequence.

In the second step, the first node estimates S2, using the pilot signal 30a, a channel response $\hat{H}$ from the first node 10c to the third node 10a. More precisely, let $\hat{H}_I$ denote an estimate of the channel response from the receiver of an existing directional transmission, e.g. access point 10a, to a potential transmitter, e.g. access point 10c. Such an estimate of $\hat{H}_I$ is obtained using the omnidirectional pilot signal 30a transmitted from node 10a. Assuming channel reciprocity, then $\hat{H}$ is equal to the transpose of $\hat{H}_I$ i.e. $\hat{H}_I^T$.

In the next step the first node predicts S3, based on the estimated channel response $\hat{H}$, an interference level at the receiver of the third node 10a of a directive transmission 40d from the first node 10c to the second node 20d. For example, let P denote the precoding matrix that would be used to transmit from a contending transmitter, e.g. access point 10c, to its potential receiver e.g. user equipment 20d. Before sending RTS to its potential receiver, the potential transmitter first computes a predicted interference level $I_{predict}$ and checks if such interference level is acceptable. For example, assuming that the channel reciprocity holds, the reversed channel response from the contending transmitter to the unintended receiver user equipment 20d can be estimated simply by the transpose of the estimates channel response $\hat{H}_I^T$, i.e. $\hat{H}=\hat{H}_I$. Hence, according to one aspect the step of estimating S2 a channel response $\hat{H}$ from the first node 10c to the third node 10a comprises calculating channel response $\hat{H}_I$ from the third node 10a to the first node 10c and assuming channel reciprocity.

Based on this estimate, the contending transmitter i.e. access point 10c, may compute the power of the directive transmission at the destination by applying the superposition principle in electromagnetic field theory which gives that, for all linear systems, the net response at a given place and time caused by two or more stimuli is the sum of the responses which would have been caused by each stimulus individually. Hence according to one aspect of the proposed technique, the power of the directive transmission 40d from the first node 10c at the third node 10a is estimated by applying the precoder P of the directive transmission 40d from the first node 10c on the estimated channel response $\hat{H}$.

For example access point 10c, may compute:

$$I_{predict} = tr\{\hat{H}PP^H\hat{H}^H\} = tr\{\hat{H}_I^T PP^H \hat{H}_I^*\} = tr\{PP^H \hat{H}_I^* \hat{H}_I^T\},$$

where $tr\{A\}$ denotes the trace of matrix A and $P^H$ is the conjugate transpose of P, and $\hat{H}_I^*$ is the conjugate of $\hat{H}_I$ (i.e. the elements of $\hat{H}_I^*$ are the conjugates of the corresponding elements of $\hat{H}_I$), and transmit to its contending transmitter if and only if $I_{predict} \leq \varepsilon$, where $\varepsilon$ denotes a predetermined maximum tolerable interference rise over thermal noise in the network.

Alternatively, the predicted interference level may be computed based on long-term channel covariance, $\Phi_{\hat{H}} = E\{\hat{H}^H\hat{H}\} = E\{\hat{H}_I^*\hat{H}_I^T\} = \Phi_{\hat{H}_I^T}$, instead of instantaneous channel response $\hat{H}_I^T$. In this case, only the reciprocity of the channel statistics is assumed, and the reciprocity of the instantaneous channel response is not needed. The contending transmitter (access point 10c) may compute, for example, $$I_{predict} \equiv tr\{PP^H \Phi_{\hat{H}}\} = tr\left\{PP^H \Phi_{\hat{H}_I^T}\right\} \approx \frac{1}{|F|} tr\left\{PP^H \sum_{f \in F} \hat{H}_I^*(f) \hat{H}_I^T(f)\right\},$$

where $\hat{H}_I^T(f)$ denotes the channel estimate obtained at frequency f within a predefined set F of possible frequencies.

According to one aspect the proposed technique comprises configuring S4 the transmission from the first node 10c to the second node 20d in order to avoid interference of the directive transmission 40d from the first node 10c, at the receiver of the third node 10a.

According to a first embodiment, this is achieved by calculating S4a a precoder P such that the predicted interference level is below a value. Precoding is a generalization of beamforming to support multi-stream (or multi-layer) transmission in multi-antenna wireless communications.

According to a second embodiment the shared medium is accessed of via null forming. According to this embodiment the precoder P is calculated S4b such that a null is formed at the third node 10a to avoid causing any interference to the third node. Hence, based on the channel estimate $\hat{H}_I^T$, the potential transmitter, access point 10c, can also intentionally put a null at the receiver access point 10a, and thus (almost) completely avoid causing interference at access point 10a. This can be done by first identifying a set of basis vectors for null space of $\hat{H}_I^T$, denoted by $V_{null}(\hat{H}_I^T)$. Hence, according to the second embodiment, the step of calculating S4b a precoder P such that a null is formed at the third node 10a comprises determining a set of basis vectors of the null space of the channel response from the first node 10c to the third node 10a.

For example, according to a one possible implementation of calculating S4b a precoder, one can first compute a QR factorization of the matrix $\hat{H}_I^*$ as, $$\hat{H}_I^* = QR = [Q_1, Q_2]\begin{bmatrix} R_1 \\ 0 \end{bmatrix}$$

where $Q$, $Q_1$ and $Q_2$ are orthonormal matrices, $R$ and $R_1$ are upper-triangular matrices, and then set $V_{null}(\hat{H}_I^T)$ to be $Q_2$, i.e. those columns of Q that corresponds to the rows of R that are all zeros (or very close to zero).

The precoder P can then be calculated by computing a concatenated channel response based on the set of basis vectors of the null space of the channel response from the first node 10c to the third node 10a and the channel response from the first node to the second node 20d and calculating a component precoder P' based on the concatenated channel response. Hence, the precoder P for transmitting from the potential transmitter of the first node, access point 10c, to the potential receiver the second node, user equipment 20d can then be computed by first computing a component precoder P' by treating the concatenated channel response given by $\hat{H}_D' = \hat{H}_D V_{null}(\hat{H}_I^T)$, as if it was the channel response from the first node, access point 10c, to the second node, user equipment 20d. Here $\hat{H}_D$ denotes an estimate of the channel response from the first node, access point 10c, to the second node, user equipment 20d.

The final precoder P is then computed by combining the component precoder P' and the set of basis vectors of the null space of the channel response from the first node 10c to the third node 10a. For example, the precoder is computed by $P = V_{null}(\hat{H}_I^T)P'$, which always satisfies $\hat{H}_I^T P' = \hat{H}_I^T V_{null}(\hat{H}_I^T) P' = 0$ by the definition of $V_{null}(\hat{H}_I^T)$. Hence, the precoder P so computed will not cause any interference to the third node 10a. In this case, the potential transmitter which is the first node, access point 10c, may still choose to transmit (using precoder P) to the second node, user equipment 20d, even though the first node, access point 10c, heard the omnidirectional transmission from the third node 10a, and thus enhancing the efficiency of the network.

Figure 7:
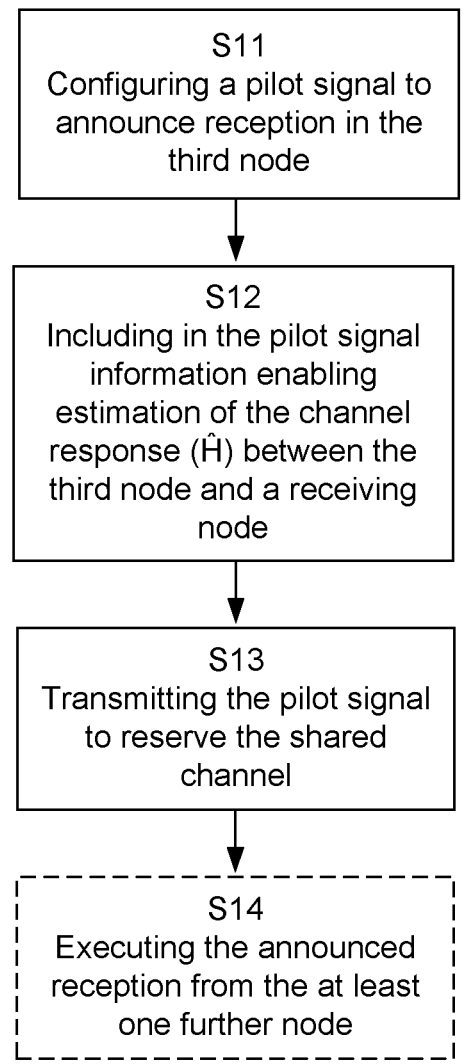
FIG. 7 is a flowchart illustrating method steps executed in a node transmitting a pilot according to one aspect of the disclosure.

In the final step, the first node accesses S5 the shared channel based on the predicted interference level. The predicted interference may be used in many ways while accessing the channel, as will be further described below. According to one aspect the step of accessing S5 the shared channel based on the predicted interference level comprises delaying or aborting the transmission from the first node 10c if the predicted interference level is above a predetermined value. According to this aspect of the disclosure, the first node considers the interference between the intended transmission 40d and the ongoing reception 40a in the third node 10a. Then the first node may choose to delay the transmission until the reception at the third node is finalised. The first node may also abort the intended transmission. FIG. 7 is a flowchart illustrating method steps executed in a third node e.g. access point 10a of FIG. 5, in a wireless communication system, of reserving a shared channel for reception 40a from at least one further node 20a. The method is typically executed by a node that is about to receive a signal from a further node. The signal may comprise a control message or data.

The method comprises three steps. The first step is configuring S11 a pilot signal 30a to announce reception 40a in the third node 10a. In the second step the third nodes includes S12 in the pilot signal 30a, information enabling estimation of the channel response $\hat{H}$ between the third node 10a and a receiving node e.g. node 10c or 20b as explained above. This is achieved e.g. by including in the pilot signal 30a a sequence, whose auto-correlation properties imply that the correlation of cyclically shifted versions of the sequence is below a predetermined value, e.g. a Zadoff-Chu, Frank or Milewski sequence.

Finally the third node 10a transmits S13 the pilot signal 30a to reserve the shared channel. According to one aspect the method further comprises the step of executing S14 the announced reception 40a from the at least one further node 20a. The pilot signal is used by a receiving node in order to make more narrow medium reservations as described above in connection with step S4 of FIG. 5.

The pilot signal from the third node may comprise a control message to the source node indicating that the third node is ready to receive data. Hence, according to one aspect the pilot signal 30a comprises a clear to send message.

Figure 8:
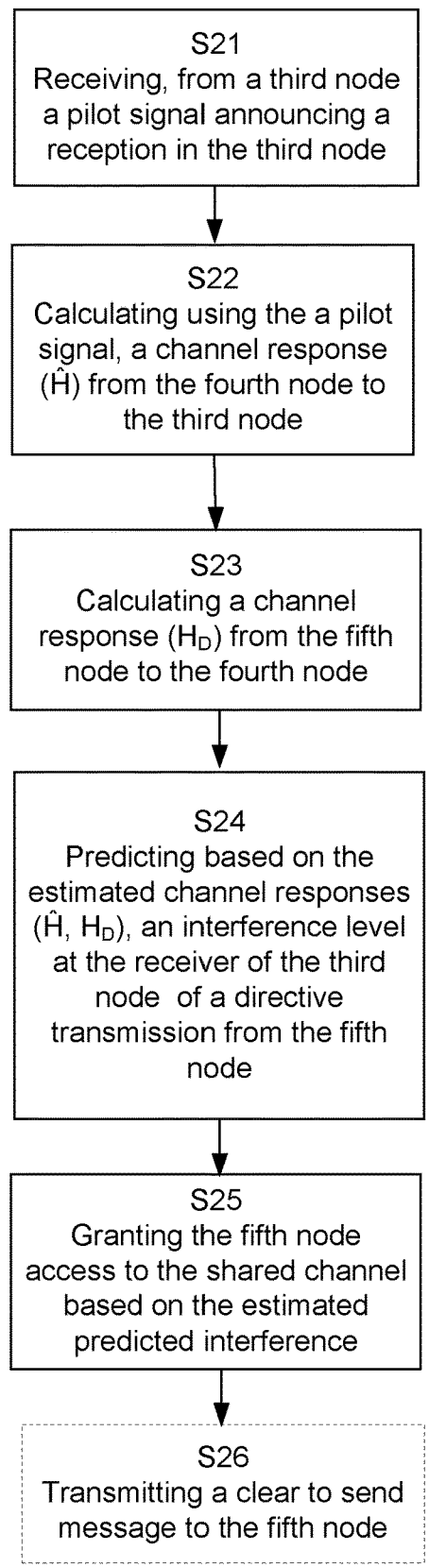
FIG. 8 is a flowchart illustrating method steps executed in a node receiving a pilot according to one aspect of the disclosure.

FIG. 8 is a flowchart illustrating a method, performed in a fourth node, here user equipment 20b in FIG. 5, in a wireless communication system, of granting a fifth node, user equipment 20c, access to a shared channel for transmission from the fifth node 20c to the fourth node 20b. The method relates to a situation where a fifth node 20c that is about to transmit, cannot hear the omnidirectional pilot signal from access point 10a. However, its intended receiver, which is a fourth node, user equipment 20b, can hear the pilot signal. In this case, upon receipt of a RTS from the fifth node, user equipment 20c, the fourth node, user equipment 20b may not respond with a CTS in order to avoid interfering with access point 10a since the omnidirectional pilot is received.

In the first step of the method described in FIG. 5, the fourth node 20b receives S21, from a third node 10a a pilot signal announcing reception in the third node 10a, wherein the pilot signal 30a comprises information enabling estimation of a channel response $\hat{H}$ from the fourth node 20b to the third node 10a.

In the next step, the fourth node calculates S22, using a pilot signal 30a, a channel response $\hat{H}$ from the fourth node 20b to the third node 10a. This may be done by calculating channel response $\hat{H}_I$ from the third node 10a to the fourth node 20b and assuming channel reciprocity, i.e. that the channel response of one direction is the transpose of that of the other direction ($\hat{H}=\hat{H}_I^T$).

In the next step, the fourth node calculates S23 an estimate of the channel response $\hat{H}_D$ from the fifth node 20c to the fourth node 20b. If the fourth node, user equipment 20b, obtains an estimate of the channel $\hat{H}$ from the fourth node, user equipment 20b, to the third node, access point 10a, using the omnidirectional pilot signal from access point 10a, it can check whether the transmission from the fifth node, user equipment 20c, to the fourth node, user equipment 20b, would affect the reception at the third node, access point 10a, to the extent that the reception is affected e.g. by causing interference or collisions. This will be explained in the following steps.

In the next step, the fourth node predicts S24, based on the estimated channel responses $\hat{H}$ and $\hat{H}_D$, an interference level at the receiver of the third node 10a of a directive transmission 40b from the fifth node 20c. The prediction may comprise computations that may be done in different ways.

According to one embodiment the step of estimating S24 the predicted interference level based on the channel responses $\hat{H}$ and $\hat{H}_D$ comprises estimating the power of a signal propagating from the fifth node 20c at the third node. This can be done by computing the magnitude of the concatenated channel response $\hat{H}\hat{H}_D=\hat{H}_I^T\hat{H}_D$. Note that $\hat{H}_D$ may represent an estimate of the possibly precoded or beam formed effective channel response from the fifth node, user equipment 20c, to the fourth node, user equipment 20b. More precisely, when the fourth node, user equipment 20b, can hear the omnidirectional pilot signal from access point 10a, the fourth node, user equipment 20b, may still send a CTS message back to the fifth node, user equipment 20c, if and only if:

$$I_{predict}=\|\hat{H}\hat{H}_D\|_F=\|\hat{H}_I^T\hat{H}_D\|_F\leq\varepsilon,$$

where $\|\cdot\|_F$ denote the Frobenius norm, and $\varepsilon$ denotes a predetermined maximum tolerable interference level in the network. Hence, according to this aspect, the step of granting the fifth node access comprises comparing the predicted interference level with a predetermined value. In this case, the contending transmitter, i.e. the fifth node 20c, may still obtain permission to transmit to the fourth node, user equipment 20b even though the fourth node, user equipment 20b, heard the omnidirectional transmission, and thus enhancing the efficiency of the network. This method may be particularly effectively when the channel $\hat{H}_D$ is estimated over beam-formed pilot signal from the fifth node, user equipment 20c, and thus represents a composite channel response of the original channel from the fifth node, user equipment 20c, to the fourth node, user equipment 20b, and the adopted precoding matrix.

Alternatively, the predicted interference level may be computed based on long-term channel covariances, $\Phi_{\hat{H}_I}=E\{\hat{H}_I^*\hat{H}_I^T\}$ and $\Phi_{\hat{H}_D}=E\{\hat{H}_D\hat{H}_D^H\}$, instead of the instantaneous channel responses, $\hat{H}_I^T$ and $\hat{H}_D$, where $\hat{H}_D^H$ is the conjugate transpose of $\hat{H}_D$ and E denotes an expected value. In this case, the reciprocity of the instantaneous channel response is not needed. The fourth node, user equipment 20b may send a CTS message back to the fifth node, user equipment 20c if, for example, $$I_{predict}=tr\{\Phi_{\hat{H}_I}\Phi_{\hat{H}_D}\}\leq\varepsilon^2.$$

In the next step, the fourth node grants S25 the fifth node 20c access to the shared channel based on the predicted interference level. This may be done by adopting the transmission in different ways, e.g. by requesting the fifth node to redirect the beam, delaying the transmission or calculating a precoder, such that a null is formed at the third node 10a to avoid causing any interference to the third node. The principles described in relation to FIG. 6 are applicable on this situation as well. According to one aspect, the method of granting access to a shared channel further comprises the step of transmitting S26 a clear to send message to the fifth node 20c.

Figure 9A:
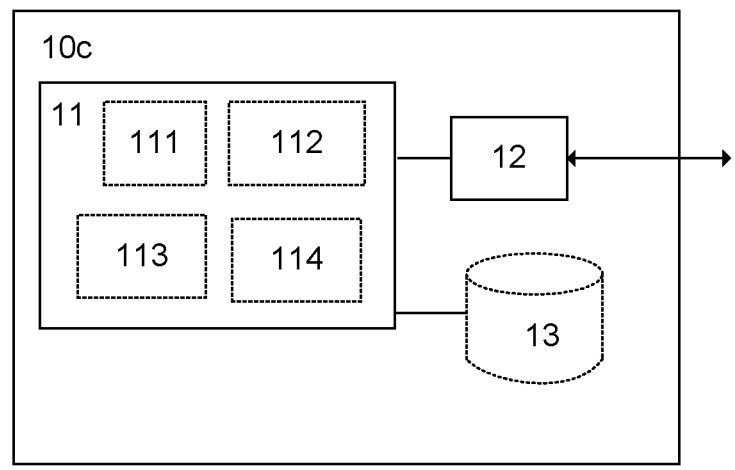
FIG. 9a is a block diagram illustrating a node receiving a pilot signal according to one aspect of the disclosure.
Figure 9B:
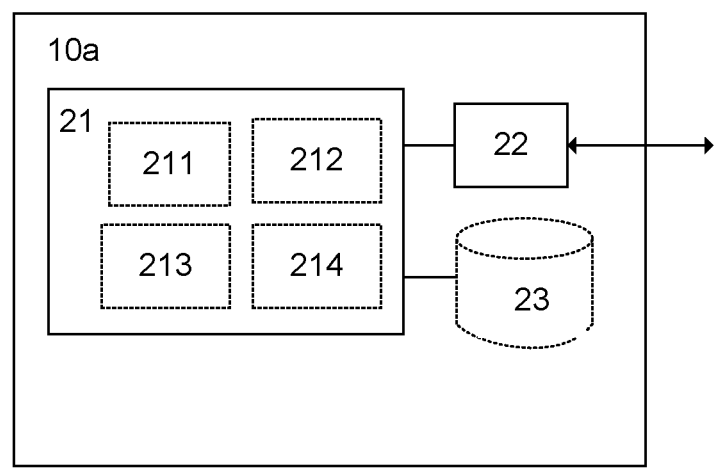
FIG. 9b is a block diagram illustrating a node transmitting a pilot signal according to one aspect of the disclosure.
Figure 9C:
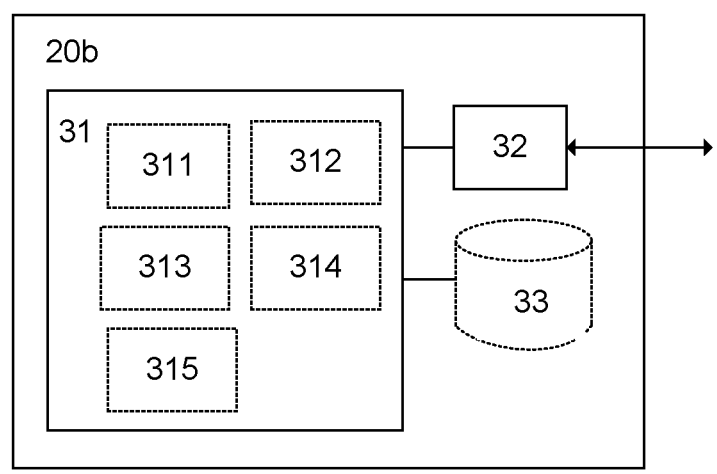
FIG. 9c is a block diagram illustrating a node receiving a pilot signal according to one aspect of the disclosure.

Turning now to FIGS. 9a to 9c schematic diagrams illustrating some modules of an exemplary aspect of a first node 10c, a third node 10a and a fourth node 20b will be described. In this application the term "node" is generally used. A node is any wireless device in wireless communication system. Hence, the node may be an access point 10a, 10c user equipment 20a-20d or any other device in the wireless communication comprising means for accessing a shared media.

The nodes comprise a controller, CTL, or a processing circuitry 11, 21, 31 that may be constituted by any suitable Central Processing Unit, CPU, microcontroller, Digital Signal Processor, DSP, etc. capable of executing computer program code. The computer program may be stored in a memory (MEM) 13, 23, 33. The memory 13, 23, 33 can be any combination of a Read And write Memory, RAM, and a Read Only Memory, ROM. The memory 13, 23, 33 may also comprise persistent storage, which, for example, can be any single one or combination of magnetic memory, optical memory, or solid state memory or even remotely mounted memory. The nodes 10c, 10a, 20b further comprises a communication interface (i/f), 12, 22 and 32 respectively, arranged for wireless communication with other devices or nodes.

FIG. 9a discloses a first node 10c configured for accessing a shared channel for transmission from the first node 10c to at least one second node 20d. When the above-mentioned computer program code is run in the processing circuitry 11 of the first node 9a, it causes the first node 9a to receive, from a third node 10a a pilot signal 30a announcing reception in the third node 10a, wherein the pilot signal 30a comprises information enabling estimation of a channel response $\hat{H}$ from the first node 10c to the third node 10a, estimate, using the pilot signal 30a, a channel response $\hat{H}$ from the first node 10c to the third node 10a, predict, based on the estimated channel response $\hat{H}$, an interference level of a directive transmission 40d from the first node 10c to the second node 20d at the receiver of the third node 10a and access, the shared channel based on the predicted interference level.

According to one aspect of the disclosure the controller comprises:
 a receiver module 111 configured to receive, from a third node 10a a pilot signal 30a announcing reception in the third node 10a, wherein the pilot signal 30a comprises information enabling estimation of a channel response $\hat{H}$ from the first node 10c to the third node 10a;

an estimator 112 configured to estimate, using the pilot signal 30a, a channel response $\hat{H}$ from the first node 10c to the third node 10a;

a predictor 113 configured to predict, based on the estimated channel response $\hat{H}$, an interference level of a directive transmission 40d from the first node 10c to the second node 20d at the receiver of the third node 10a; and an access module 114 configured to access, using the communication unit 12, the shared channel based on the predicted interference level.

According to one aspect the controller further comprises a configurer 115 adapted for configuring the transmission from the first node 10c to the second node 20d in order to avoid interference of the directive transmission 40d from the first node 10c, at the receiver of the third node 10a.

The receiver module 111, the estimator 112, the predictor 113, the access module 114 and the configurer 115 are implemented in hardware or in software or in a combination thereof. The modules 111, 112, 113, 114, 115 are according to one aspect implemented as a computer program stored in a memory 13 which run on the processing circuitry 11.

FIG. 9b discloses a third node 10a in a contention based wireless communication system, configured for reserving a shared channel for reception from at least one further node. When the above-mentioned computer program code is run in the processing circuitry 21 of the third node 10a, it causes the third node 10a to a configure a pilot signal 30a to announce reception 40a in the third node 10a, to include in the pilot signal 30a information enabling estimation of the channel response $\hat{H}$ between the third node 10a and a receiving node 10c, 20b and transmit, using the communication unit 22, the pilot signal 30a to reserve the shared channel.

According to one aspect of the disclosure the controller 21 comprises:

a configurer 211 configured to configure a pilot signal 30a to announce reception 40a in the third node 10a;

an includer 212 configured to include in the pilot signal 30a information enabling estimation of the channel response $\hat{H}$ between the third node 10a and a receiving node 10c, 20b and a transmitter 213 module configured to transmit, using the communication unit 22, the pilot signal 30a to reserve the shared channel.

According to one aspect the controller further comprises an executer 214 adapted to execute the announced reception 40a from the at least one further node 20a.

The receiver module 211, the access module 212, the predictor 213 and the executor 214 are implemented in hardware or in software or in a combination thereof. The modules 211 to 213 are according to one aspect implemented as a computer program stored in a memory 23 which runs on the processing circuitry 21.

Hence, according to a further aspect the disclosure relates to a computer program, comprising computer readable code which, when run on a node in a cellular communication system, causes the node to perform any of the methods described above.

FIG. 9c discloses a fourth node 20b in a wireless communication system, configured for reserving a channel for signal transmission from the second node to at least one further node.

When the above-mentioned computer program code is run in the processing circuitry 31 of the node 20b, it causes the node 20b to receive, using communication unit 32, from a third node 10a a pilot signal announcing reception in the third node 10a, wherein the pilot signal 30a comprises information enabling estimation of a channel response $\hat{H}$ from the fourth node 20b to the third node 10a, calculate, using the a pilot signal 30a, a channel response $\hat{H}$ from the fourth node 20b to the third node 10a, calculate a channel response $\hat{H}_I$ from the fifth node 20c to the fourth node 20b, predict, based on the estimated channel responses $\hat{H}$, $\hat{H}_I$, an interference level at the receiver of the third node 10a caused by a directive transmission 40b from the fifth node 20c and grant the fifth node 20c access to the shared channel based on the predicted interference level.

According to one aspect of the disclosure the controller 31 comprises:

a receiver module 311 configured to receive, using communication unit 32, from a third node 10a a pilot signal announcing reception in the third node 10a, wherein the pilot signal 30a comprises information enabling estimation of a channel response $\hat{H}$ from the fourth node 20b to the third node 10a, a first calculator module 312 configured to, using the a pilot signal 30a, a channel response $\hat{H}$ from the fourth node 20b to the third node 10a;

a second calculator module 313 configured to calculate a channel response $\hat{H}_I$ from the fifth node 20c to the fourth node 20b;

a third calculator receiver module 314 configured to calculate, based on the estimated channel responses $\hat{H}$, $\hat{H}_I$, an interference level at the receiver of the third node 10a caused by a directive transmission 40b from the fifth node 20c;

a receiver module 315 configured to grant the fifth node 20c access to the shared channel based on the predicted interference level.

According to one further aspect the controller further comprises a transmitter module 316 configured to transmit a clear to send message to the fifth node 20c.

The receiver module 311, the calculators 312, 313, 314 the receiver module 315 are implemented in hardware or in software or in a combination thereof. The modules 311 to 315 are according to one aspect implemented as a computer program stored in a memory 33 which runs on the processing circuitry 31.

Hence, according to a further aspect the disclosure relates to a computer program, comprising computer readable code which, when run on a node in a cellular communication system, causes the node to perform any of the methods described above.

The first, third and fourth nodes are further configured to implement all the aspects of the disclosure as described in relation to the methods above.

According to a more general aspect of the proposed technique, the media access is based on certain channel knowledge (such as direction, path loss, and/or delay) related to the channel. Then, the pilot signal comprises information enabling estimation of certain knowledge (such as direction, path loss, and/or delay) related to the channel between the node sending the pilot signal and the node receiving the pilot signal.

Hence, according to this aspect the disclosure relates to predicting interference based on any specific information about the channel (instead of only the channel response). While the description above has been focused on implementing the disclosure, for the case when the channel knowledge is the channel response, similar results may be achieved by making predictions based only on e.g. the direction and path loss. This aspect is applicable to all the variants in the examples above.

Hence, this general aspect relates e.g. to a method, performed in a first node 10c in a wireless communication system, of accessing a shared channel for transmission from the first node 10c to at least one second node 20d. The method comprises:

receiving S1, from a third node 10a a pilot signal 30a announcing reception in the third node 10a, wherein the pilot signal 30a comprises information enabling estimation of channel knowledge of the channel from the first node 10c to the third node 10a;

estimating S2, using the pilot signal 30a, channel knowledge of the channel from the first node 10c to the third node 10a;

predicting S3, based on the estimated channel knowledge an interference level at the receiver of the third node 10a of a directive transmission 40d from the first node 10c to the second node 20d; and accessing S5 the shared channel based on the predicted interference level.

According to another aspect it relates to a method, performed in a third node 10a in a wireless communication system, of reserving a shared channel for reception 40a from at least one further node 20a. The method then comprises:

configuring S11 a pilot signal 30a to announce reception 40a in the third node 10a;

including S12 in the pilot signal 30a information enabling estimation of channel knowledge of a channel between the third node 10a and a receiving node 10c, 20b and transmitting S13 the pilot signal 30a to reserve the shared channel.

The invention claimed is:

1. A method, performed in a first node in a wireless communication system, of accessing a shared channel for transmission from the first node to at least one second node, the method comprising:

receiving, from a third node a pilot signal announcing reception in the third node, wherein the pilot signal comprises information enabling estimation of a channel response from the first node to the third node;

estimating, using the pilot signal, a channel response from the first node to the third node;

predicting, based on the estimated channel response from the first node to the third node, an interference level at the receiver of the third node caused by a directive transmission from the first node to the second node; and accessing the shared channel for the directive transmission from the first node to the second node based on the predicted interference level at the receiver of the third node caused by the directive transmission from the first node to the second node.

2. The method of accessing a shared channel according to claim 1, wherein the pilot signal comprises a sequence, whose auto-correlation properties imply that the correlation of cyclically shifted versions of the sequence is below a predetermined value.

3. The method of accessing a shared channel according to claim 1, wherein the sequence is a Zadoff-Chu, Frank or Milewski sequence.

4. The method of accessing a shared channel according to claim 1, wherein the step of estimating a channel response from the first node to the third node comprises calculating channel response from the third node to the first node and assuming channel reciprocity.

5. The method of accessing a shared channel according to claim 1, wherein the step of predicting an interference level implies estimating the power of the directive transmission from the first node at the third node by applying a precoder of the directive transmission from the first node on the estimated channel response.

6. The method of accessing a shared channel according to claim 1 further comprising:

configuring the transmission from the first node to the second node in order to avoid interference of the directive transmission from the first node, at the receiver of the third node.

7. The method of accessing a shared channel according to claim 6 wherein the step of configuring the transmission comprises:

calculating a precoder such that the predicted interference level is below a value.

8. The method of accessing a shared channel according to claim 6 wherein the step of configuring the transmission comprises:

calculating a precoder such that a null is formed at the third node to avoid causing any interference to the third node.

9. The method of accessing a shared channel according to claim 8 wherein the step of calculating a precoder such that a null is formed at the third node further comprises:

determining a set of basis vectors of the null space of the channel response from the first node to the third node.

10. A method, performed in a fourth node in a wireless communication system, of granting a fifth node access to a shared channel for transmission from the fifth node to the fourth node, the method comprising:

receiving, from a third node a pilot signal announcing reception in the third node, wherein the pilot signal comprises information enabling estimation of a channel response from the fourth node to the third node;

calculating, using the a pilot signal, a channel response from the fourth node to the third node;

calculating a channel response from the fifth node to the fourth node;

predicting, based on the estimated channel responses, an interference level at the receiver of the third node caused by a directive transmission from the fifth node to the fourth node;

granting the fifth node access to the shared channel for the directive transmission from the fifth node to the fourth node based on the predicted interference level at the receiver of the third node caused by the directive transmission from the fifth node to the fourth node.

11. The method of granting access to a shared channel according to claim 10, wherein the step of calculating a channel response from the fourth node to the third node comprises calculating channel response from the third node to the fourth node and assuming channel reciprocity.

12. The method of granting access to a shared channel according to claim 10, wherein the step of estimating based on the channel responses the predicted interference level comprises estimating the power of a signal propagating from the fifth node at the third node.

13. The method of granting access to a shared channel according to claim 10, wherein the step granting the fifth node access comprises comparing the predicted interference level with a predetermined value.

14. The method of granting access to a shared channel according to claim 10, further comprising:

transmitting a clear to send message to the fifth node.

15. A first node in a wireless communication system, configured for accessing a shared channel for transmission from the first node to at least one second node, the first node comprising:
- a communication unit and
- processing circuitry adapted to:
   - receive, using the communication unit, from a third node a pilot signal announcing reception in the third node, wherein the pilot signal comprises information enabling estimation of a channel response from the first node to the third node;
   - estimate, using the pilot signal, a channel response from the first node to the third node;
   - predict, based on the estimated channel response from the first node to the third node, an interference level at the receiver of the third node caused by a directive transmission from the first node to the second node; and
   - access, using the communication unit, the shared channel for the directive transmission from the first node to the second node based on the predicted interference level at the receiver of the third node caused by the directive transmission from the first node to the second node.

* * * * *